(12) United States Patent
Avasiloaie et al.

(10) Patent No.: US 10,071,712 B2
(45) Date of Patent: Sep. 11, 2018

(54) WIPER ADAPTER AND WIPER ASSEMBLY INCORPORATING THE SAME

(71) Applicant: TRICO PRODUCTS CORPORATION, Rochester Hills, MI (US)

(72) Inventors: Valentin Avasiloaie, Dearborn Heights, MI (US); Dan Ehde, Ortonville, MI (US)

(73) Assignee: Trico Products Corporation, Rochester Hills, MI (US)

( * ) Notice: Subject to any disclaimer, the term of this patent is extended or adjusted under 35 U.S.C. 154(b) by 92 days.

(21) Appl. No.: 14/757,739

(22) Filed: Dec. 23, 2015

(65) Prior Publication Data

US 2016/0207501 A1 Jul. 21, 2016

Related U.S. Application Data

(60) Provisional application No. 62/096,074, filed on Dec. 23, 2014.

(51) Int. Cl.
*B60S 1/40* (2006.01)
*B60S 1/38* (2006.01)

(52) U.S. Cl.
CPC ............ *B60S 1/4048* (2013.01); *B60S 1/387* (2013.01); *B60S 1/4003* (2013.01); *B60S 2001/4051* (2013.01); *B60S 2001/4054* (2013.01)

(58) Field of Classification Search
CPC .... B60S 1/4003; B60S 1/4045; B60S 1/4048; B60S 2001/4051; B60S 2001/4054; B60S 1/387

USPC ...................................................... 15/250.32
See application file for complete search history.

(56) References Cited

U.S. PATENT DOCUMENTS

| | | | |
|---|---|---|---|
| 7,774,892 B2 * | 8/2010 | Coughlin | B60S 1/4038 15/250.32 |
| 2010/0000041 A1 * | 1/2010 | Boland | B60S 1/3868 15/250.32 |
| 2012/0060316 A1 * | 3/2012 | Avasiloaie | B60S 1/381 15/250.33 |
| 2012/0180244 A1 * | 7/2012 | Kim | B60S 1/387 15/250.31 |
| 2013/0067675 A1 * | 3/2013 | Chien | B60S 1/3851 15/250.32 |

* cited by examiner

*Primary Examiner* — Gary Graham
(74) *Attorney, Agent, or Firm* — Miller Canfield

(57) ABSTRACT

An adapter for attaching a wiper assembly to a wiper arm having an attachment member including an end with a bent tab extending outwardly therefrom, and walls having fins. The adapter includes a body having first and second ends. A retention member is disposed at the first end for abutting the fin. A canard extends from the retention member toward the second end and is adapted to be disposed adjacent to one of the walls. A stop is disposed closer to the second end than the first. A guard is spaced longitudinally from the stop and has a cam surface and an engagement surface. A bridge connects the guard to the body and is adapted to flex when the guard pivots from the stop in response to force translated to the cam surface from the bent tab until the engagement surface abuts at least a portion of the bent tab.

20 Claims, 13 Drawing Sheets

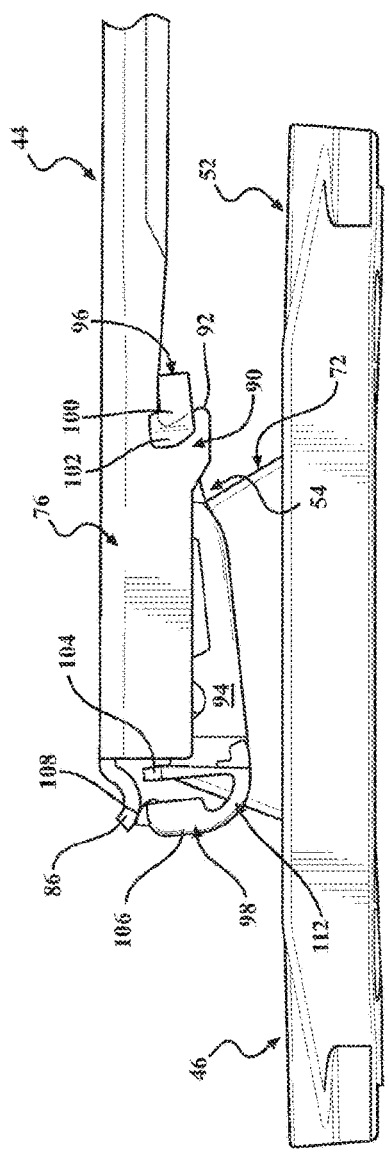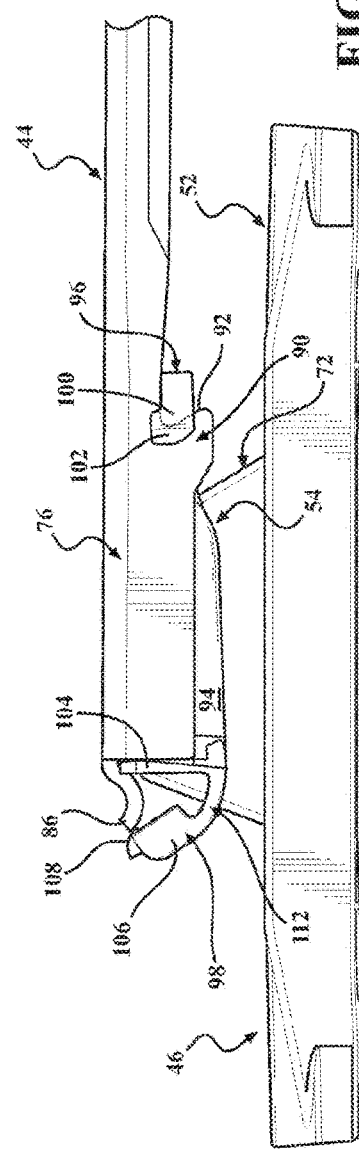

WIPER ADAPTER AND WIPER ASSEMBLY INCORPORATING THE SAME

CROSS-REFERENCE TO RELATED APPLICATION

This application is based upon and claims priority to U.S. Provisional Patent Application No. 62/096,074, filed on Dec. 23, 2014.

BACKGROUND OF THE INVENTION

1. Field of the Invention

The present invention relates generally to wiper systems, and more specifically, to wiper adapters for wiper assemblies.

2. Description of the Related Art

Conventional automotive wiper systems known in the art include some type of wiper assembly (sometimes referred to as a wiper blade) mounted to a wiper arm which, in turn, is mounted adjacent to a surface to be wiped, such as a windshield of a vehicle, and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. The wiper assembly also typically includes a coupler that attaches to and supports the one or more metal strips, and an adapter attached to the coupler. The adapter allows the wiper assembly to be releasably attached to the wiper arm. In this context, the wiper arm delivers a downward force to the wiper assembly that is distributed thereacross, pressing the wiper assembly into contact with the windshield. The wiper assembly also typically includes an airfoil that attaches to the metal strips, and may also include pair of end caps located at distal ends of the wiper assembly.

Each of the components of a wiper assembly of the type described above must cooperate to effectively clean a surface to be wiped. In addition, each of the components must be designed not only to facilitate an improved wipe quality, but also so as to reduce the cost and complexity of assembling the wiper assembly.

While wiper assemblies known in the related art have generally performed well for their intended purpose, there remains a need in the art for a wiper system that has superior operational characteristics, reduces the cost of manufacturing the assembly, and provides simple releasable attachment to a wiper arm.

SUMMARY OF THE INVENTION

The present invention overcomes the disadvantages in the related art in an adapter for use in releasably attaching a wiper assembly to a wiper arm having an attachment member including a track defined by a base and walls depending therefrom, the base having an end with a bent tab extending outwardly therefrom, the walls having fins that extend to fin ends. The adapter includes a body having a first end and a second end. At least one retention member is disposed on the body at the first end for abutting at least one of the fins of the wiper arm when the wiper assembly is attached to the wiper arm. A canard extends from the retention member toward the second end of the body and is adapted to be disposed adjacent to at least one of the walls of the wiper arm when the wiper assembly is attached to the wiper arm. The adapter also includes at least one stop member disposed closer to the second end than to the first end for abutting the end of the wiper arm when the wiper assembly is attached to the wiper arm. A guard is spaced longitudinally from the stop member and has an upper cam surface adapted to cooperate with the bent tab of the wiper arm in camming relationship when the wiper assembly is being attached to the wiper arm. The guard also has an engagement surface spaced from the upper cam surface for abutting at least a portion of the bent tab of the wiper arm when the wiper assembly is attached to the wiper arm. The adapter also includes a resilient bridge connecting the guard to the body. The bridge is adapted to flex when the guard pivots away from the stop member in response to force translated to the upper cam surface from the bent tab of the wiper arm until the engagement surface of the guard abuts at least a portion of the bent tab of the wiper arm.

In addition, the present invention is directed toward a wiper assembly for use in releasably attaching to a wiper arm having an attachment member including a track defined by a base and walls depending therefrom, the base having an end with a bent tab extending outwardly therefrom, the walls having fins that extend to fin ends. The wiper assembly includes a wiping element adapted to contact the surface to be wiped, and at least one elongated spline acting to support the wiping element. The spline has opposing longitudinal ends. An airfoil is operatively attached to the spline. A pair of end caps are operatively attached to each of the longitudinal ends of the spline. A coupler is operatively attached to the spline between the longitudinal ends. An adapter is pivotally attached to the coupler. The adapter includes a body having a first end and a second end. At least one retention member is disposed on the body at the first end for abutting at least one of the fins of the wiper arm when the wiper assembly is attached to the wiper arm. A canard extends from the retention member toward the second end of the body and is adapted to be disposed adjacent to at least one of the walls of the wiper arm when the wiper assembly is attached to the wiper arm. The adapter also includes at least one stop member disposed closer to the second end than to the first end for abutting the end of the wiper arm when the wiper assembly is attached to the wiper arm. A guard is spaced longitudinally from the stop member and has an upper cam surface adapted to cooperate with the bent tab of the wiper arm in camming relationship when the wiper assembly is being attached to the wiper arm. The guard also has an engagement surface spaced from the upper cam surface for abutting at least a portion of the bent tab of the wiper arm when the wiper assembly is attached to the wiper arm. The adapter also includes a resilient bridge connecting the guard to the body. The bridge is adapted to flex when the guard pivots away from the stop member in response to force translated to the upper cam surface from the bent tab of the wiper arm until the engagement surface of the guard abuts at least a portion of the bent tab of the wiper arm.

In this way, the adapter and wiper assembly of the present invention cooperate to effectively clean a surface to be wiped and, at the same time, provide simple releasable attachment to a wiper arm. Further, the adapter and wiper assembly of the present invention provide advantages related to manufacturing and component assembly.

BRIEF DESCRIPTION OF THE DRAWINGS

Other objects, features, and advantages of the present invention will be readily appreciated as the same becomes better understood after reading the subsequent description taken in connection with the accompanying drawings wherein:

FIG. 12 is a right side plan view of the adapter, coupler, and arm of FIGS. 10-11 in a second mid-assembly configuration.

FIG. 13 is a right side plan view of the adapter, coupler, and arm of FIGS. 10-12 in a third mid-assembly configuration.

DETAILED DESCRIPTION OF THE INVENTION

Figure 1:
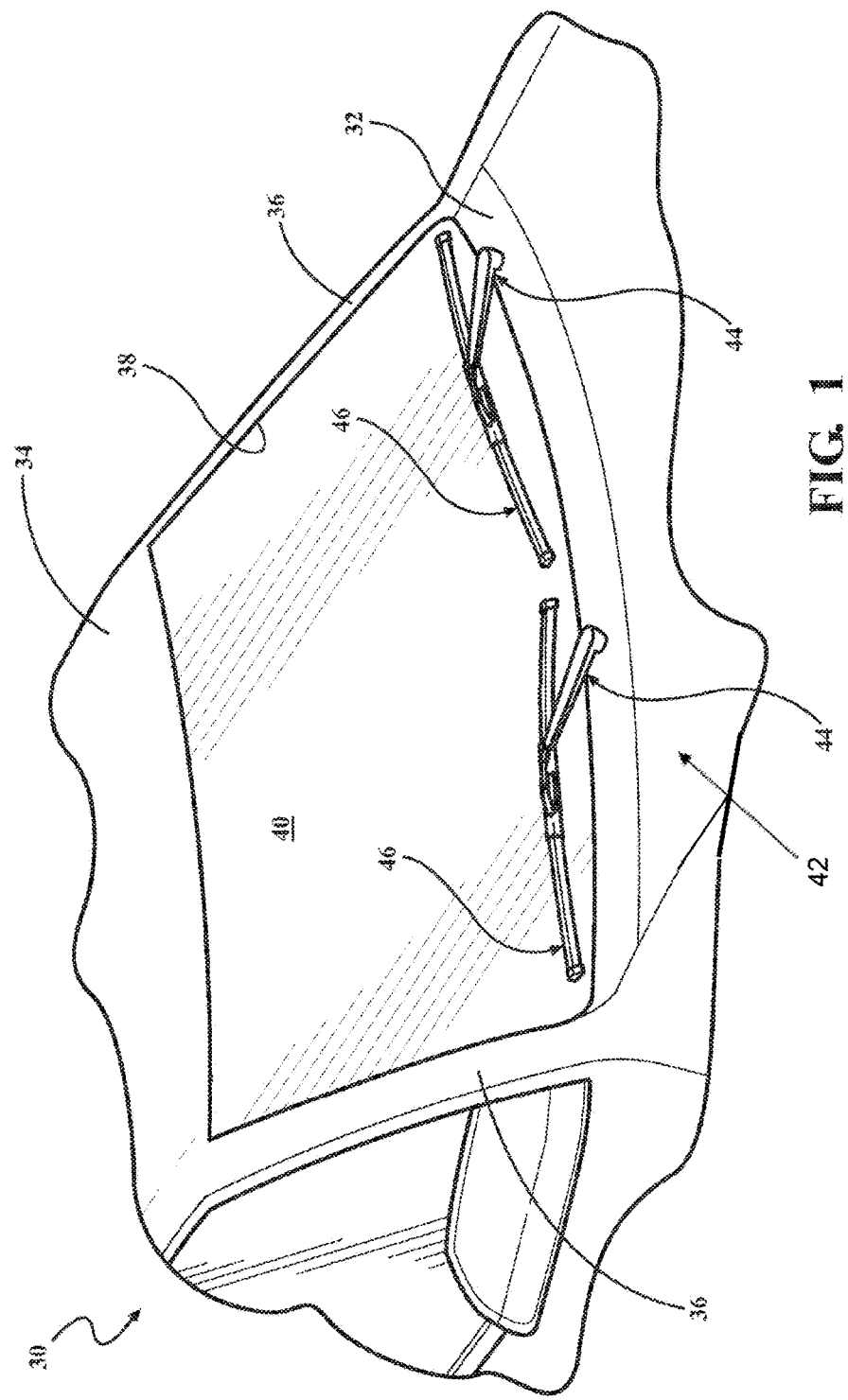
FIG. 1 is a partial perspective view of a front of a vehicle having a pair of wiper assemblies pivotally mounted to respective wiper arms for reciprocal movement across a windshield of the vehicle.

With reference to the Figures, where like numerals are used to designate like structure throughout the several views, a portion of a vehicle is schematically illustrated at 30 in FIG. 1. The vehicle 30 includes a cowl 32, a roof 34, and a pair of laterally spaced front A-pillars 36 extending between the roof 34 and the cowl 32. The A-pillars 36, roof 34, and cowl 32 cooperate to define a generally rectangular opening 38 in which a curved or "swept back" glass windshield 40 is supported. As illustrated, the vehicle 30 is an automobile, but could be any type of vehicle, such as a heavy-duty truck, train, airplane, ship, construction vehicle or equipment, military vehicle, or any other type of vehicle that contains surface wiper systems.

A wiper system is generally indicated at 42 in FIG. 1 and is employed to clean the windshield 40. The wiper system 42 includes a pair of wiper arms, generally indicated at 44, and a pair of wiper assemblies, generally indicated at 46, which correspond to the driver and passenger sides of the vehicle 30. However, those having ordinary skill in the art will appreciate that the wiper system 42 could employ a single wiper arm 44 and single wiper assembly 46, or more than two wiper arms 44 and more than two wiper assemblies 46, without departing from the scope of the present invention. In the representative example illustrated herein, each wiper assembly 46 is carried by a corresponding wiper arm 44. The wiper system 42 also includes an electric motor (not shown, but generally known in the art) to move the wiper assemblies 46 in an oscillating manner across the surface of the windshield 40.

While the wiper assembly 46 illustrated in FIG. 1 is shown in connection with the front windshield 40 of the vehicle 30, those having ordinary skill in the art will appreciate that wiper assemblies 46 could be used in other areas of the vehicle 30 that employ a wiper system 42, such as a rear window (not shown) or a head lamp (not shown). Thus, it will be understood that the present invention is not limited for use solely in connection with wiper arms 44 adapted for use on a vehicle's windshield 40, but for use in all applications where wiper systems 42 are employed.

Figure 2:
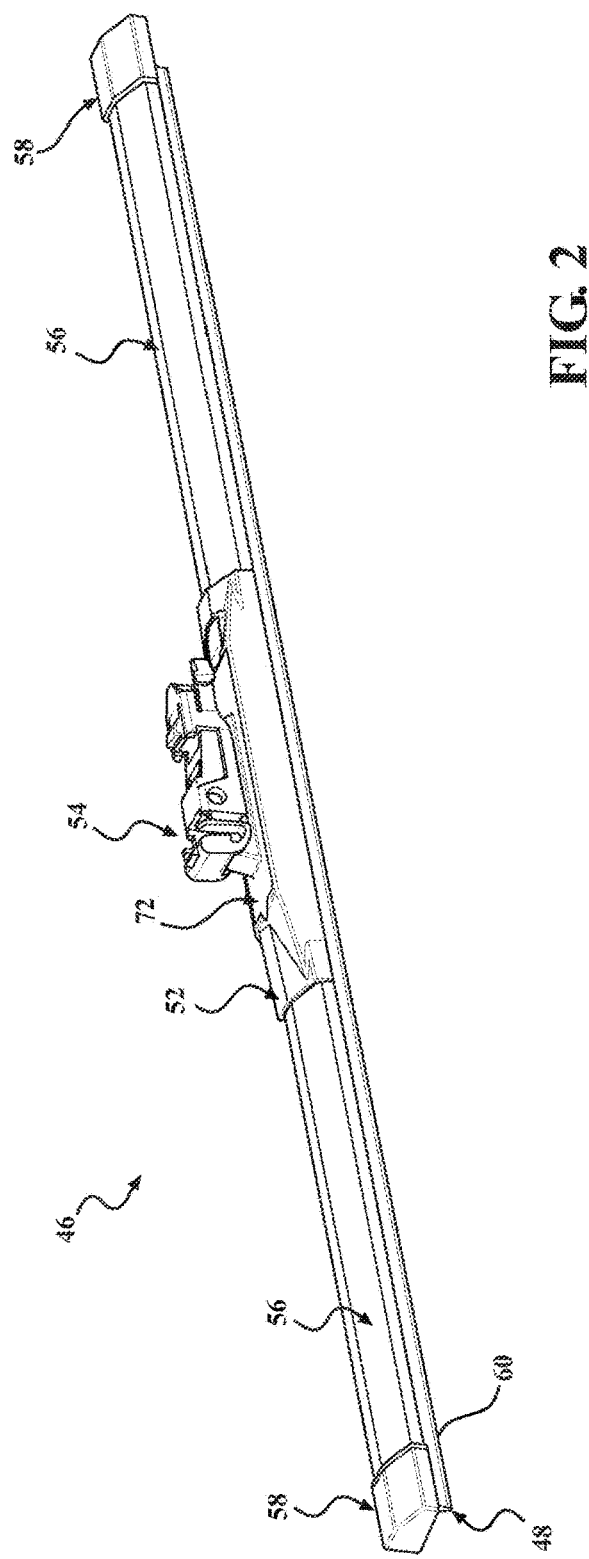
FIG. 2 is an enlarged perspective view of a wiper assembly according to one embodiment of the present invention.
Figure 3:
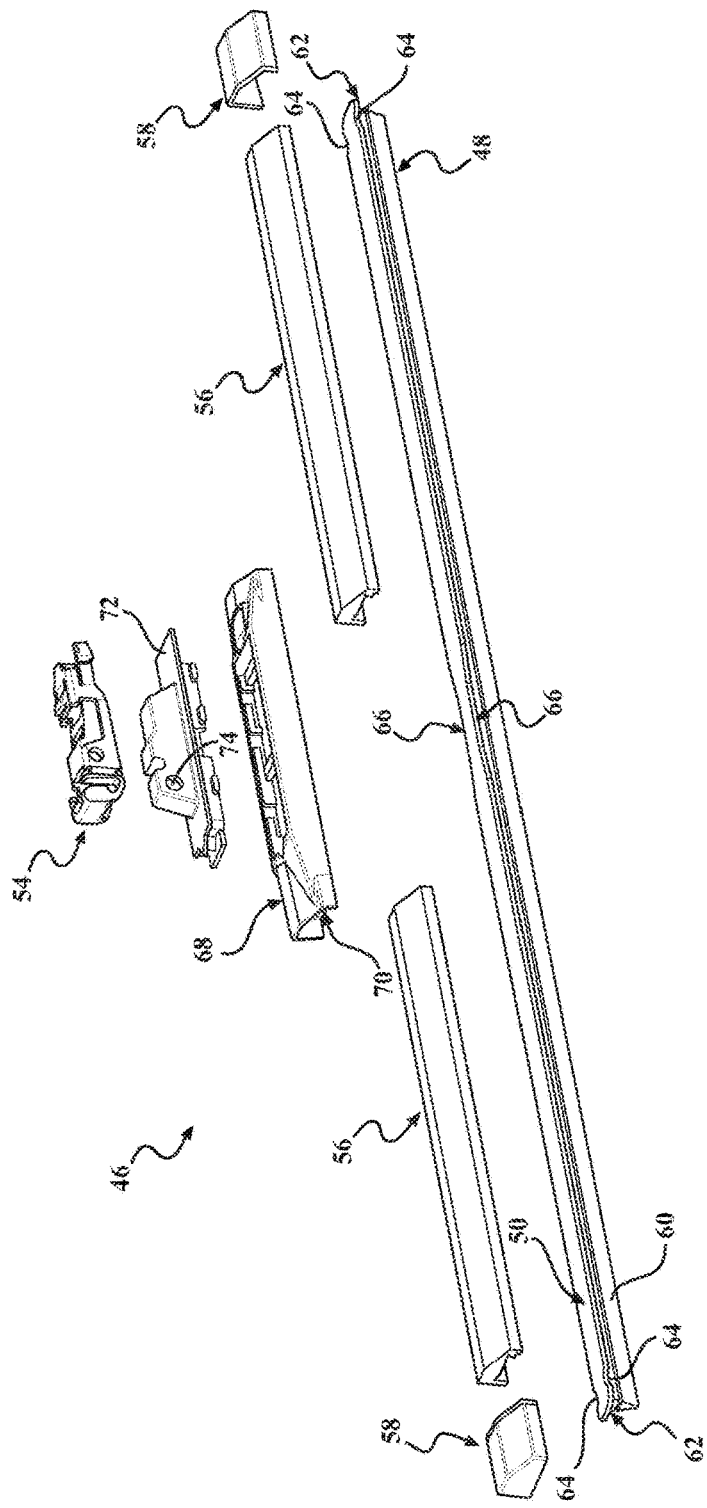
FIG. 3 is an exploded perspective view of the wiper assembly of FIG. 2.

Referring to FIGS. 2 and 3, the wiper assembly 46 includes a wiping element 48 that is adapted to contact a surface of the vehicle 30 to be wiped, in this representative example, the windshield 40. The wiper assembly 46 also includes at least one support member 50 that defines a longitudinal axis and that acts to reinforce or support the wiping element 48. In the representative embodiment illustrated herein, the support member 50 is a monolithic beam mounted directly to the wiping element 48, as described in greater detail below. However, those having ordinary skill in the art will appreciate from the description that follows that the support member 50 could be either monolithic or defined by a pair of splines (not shown, but generally known in the art) without departing from the scope of the present invention. The wiper assembly 46 also includes a coupler 52 operatively attached to the support member 50. The coupler 52 is configured to attach to an adapter 54 which, in turn, is adapted to connect to the wiper arm 44. The wiper assembly 46 also typically includes an airfoil assembly, generally indicated at 56, to prevent the wiper assembly 46 from lifting away from the surface of the windshield 40. The wiper assembly 46 may still further include one or more end caps, generally indicated at 58, to prevent the airfoil assembly 56 from disengaging the support member 40. Each of the above components will be described in greater detail below.

The wiping element 48 is configured to a predetermined length corresponding to a particular application, and is often manufactured through an extrusion process which enables the length of the wiping element 48 to be easily adjusted without a substantial increase in manufacturing expense. While the wiping element 48 is constructed from a flexible rubber, those having ordinary skill in the art will appreciate that the wiping element 48 could be constructed from any flexible material, such as silicone or another polymer, without departing from the scope of the present invention. The wiping element 48 typically includes head portion (not shown, but generally known in the art) and a wiping portion 60. The head portion is operatively attached to the monolithic support member 50 with an adhesive, such as glue (not shown, but generally known in the art). However, it will be appreciated that wiping element 48 could be operatively attached to the support member 50 in any suitable way without departing from the scope of the present invention. The wiping portion 60 of the wiping element 48 is adapted to contact the surface to be wiped 40. As shown in FIG. 3, the wiping portion 60 has a generally triangular, tapered profile. However, those having ordinary skill in the art will appreciate that the wiping portion 60 could have any suitable profile, shape, or configuration without departing from the scope of the present invention.

As previously noted, the wiper assembly 46 also includes at least one support member 50, which extends between opposed longitudinal ends 62 (see FIG. 3). The support member 50 is constructed from a resiliently flexible material, such as spring steel or a polymer, and is adapted to apply force from an intermediate position between the longitudinal ends 62. More specifically, the support member 50 receives force from the spring-loaded wiper arm 44 at an intermediate position and distributes this force across the span of the support member 50 toward the longitudinal ends 62. To that end, the support member 50 may be curved longitudinally with a predetermined radius of curvature. In the related art, this predetermined radius of curvature is sometimes referred to as a "free form" radius of curvature. Accordingly, the curvature of the support member 50 may be symmetrical or asymmetrical, depending on the force requirements of the application and the contour of the windshield 40. The flexible, free form, pre-curved support member 50 straightens out when the wiper arm 44 applies a force thereto and directs the wiping element 48 to contact the windshield 40. Thus, the elongated support member 50 includes a free-form curvature that ensures force distribution on windshields having various curvatures and that effects proper wrapping about the windshield 40.

The support member 50 may have a substantially constant width and a constant thickness throughout its length between the longitudinal ends 62. The constant width and thickness are adapted to provide high lateral and torsional stiffness so as to avoid lateral and torsional deflections, which cause the wiping element 48 to stick/slip ("chatter") on the windshield 40 during operation. Thus, the cross-section of the support member 50 has a generally rectangular outer profile that makes the support member 50 easier to manufacture. More specifically, where the support member 50 is constructed from metal, such as spring steel, the tools and machinery used to manufacture the support member 50 are less complicated than those required to manufacture a support member 50 having varying width and/or thickness. Furthermore, where the support member 50 is constructed from a polymer, such as a thermoplastic elastomer, the manufacturing tools and extrusion process machinery are also less complicated than those employed to manufacture varying width and/or thicknesses. However, those having ordinary skill in the art will appreciate that the support member 50 could have a varying thickness and/or width without departing from the scope of the present invention. Further, as mentioned above, those having ordinary skill in the art will appreciate that the support member 50 could be monolithic or could be formed as a plurality of splines (sometimes referred to in the art as a "twin rail" blade).

The support member 50 may also include one or more notches 64 that cooperate with the end caps 58 to operatively attach the airfoils 56 to the support member 50. As shown in FIG. 3, the notches 64 are generally rectangular, but those having ordinary skill in the art will appreciate that the notches could have any suitable shape, or could be omitted entirely, without departing from the scope of the present invention. Further, the support member 50 may include one or more additional securing features, generally indicated at 66, such as additional notches and/or a tapered "hourglass" region (see FIG. 3), for cooperating with the coupler 52 so as to operatively attach the support member 50 to the coupler 52. Those having ordinary skill in the art will appreciate that securing features 66 could be of any suitable shape or configuration, or could be omitted entirely, without departing from the scope of the present invention. Specifically, those having ordinary skill in the art will appreciate that the coupler 52 could be fixed to the support member 50 in several different ways. By way of non-limiting example, the coupler 52 could be glued, welded, crimped, bolted, riveted, formed-over, locked, or otherwise fixed to the support member 50, without departing from the scope of the present invention. As illustrated in FIGS. 2 and 3, the coupler 52 has a base 68 with claws 70 (not shown in detail, but generally known in the art) to attach to the support member 50.

In the embodiment illustrated herein, the coupler 52 is a unitary, one piece component. However, those having ordinary skill in the art will appreciate that the coupler 52 could be designed as a plurality of components that interlock or otherwise cooperate to operatively attach to the support member 50, without departing from the scope of the present invention. The coupler 52 is typically constructed from plastic and is formed using an injection molding process. However, those having ordinary skill in the art will appreciate that the coupler 52 could be constructed from any suitable material formed using any suitable process without departing from the scope of the present invention.

As noted above, the coupler 52 is configured to attach to the adapter 54 which, in turn, is configured to releasably attach to the wiper arm 44. In the representative embodiment illustrated herein, the base 68 of the coupler 52 is configured to releasably secure a saddle, generally indicated at 72, interposed between the coupler 52 and the adapter 54. The saddle 72 includes opposing cylindrical recesses 74 configured to pivotally engage the adapter 54 to facilitate improved connection to the wiper arm 44, as is discussed more thoroughly below. However, those having ordinary skill in the art will appreciate that the coupler 52 could be connected to the adapter 54 in any suitable way without departing from the scope of the present invention. By way of non-limiting example, the adapter 54 could be pivotally coupled directly to the coupler 52 without the use of the saddle 72. However, it will be appreciated that the interposition of the saddle 72 between the adapter 54 and the coupler 52 enables the wiper assembly 46 to be fitted with an increased number of different styles of adapters 54 and respective saddles 72, so as to releasably engage correspondingly different styles or configurations of wiper arms 44. The Applicant has described the specific configuration and structure of the coupler 52 and saddle 72 illustrated throughout the figures in published U.S. patent application Ser. No. 13/677,423, the contents of which are hereby incorporated by reference.

As noted above, the wiper assembly 46 also typically includes at least one airfoil 56 operatively mounted to the support member 50. The airfoil 56 extends substantially along the length of the wiper assembly 46 and acts to reduce the likelihood of wind lift by allowing air to flow over the wiper assembly 46. More specifically, and in the embodiment illustrated herein, the airfoil 56 is formed as two individual components operatively mounted to the support member 50, with the coupler 52 disposed between the airfoils 56. However, those having ordinary skill in the art will appreciate that the airfoil 56 could be formed as any suitable number of individual components without departing from the scope of the present invention. While the wiper assembly 46 depicted in FIGS. 2 and 3 includes airfoils 56 with angled profiles that extend along a substantially constant cross-section, those having ordinary skill in the art will appreciate that the airfoils 56 could be formed differently without departing from the scope of the present invention. The airfoil 56 is configured to a predetermined length corresponding to a particular application, and may be manufactured by an extrusion process. However, those having ordinary skill in the art will appreciate that the airfoil 56 could be constructed in other ways, such as by an injection molding, without departing from the scope of the present invention. Moreover, those having ordinary skill in the art will appreciate that manufacturing by extrusion enables the length of the airfoil 56 to be easily adjusted without a substantial increase in manufacturing expense. Further still, while the airfoil 56 is constructed from plastic, those having ordinary skill in the art will appreciate that the airfoil 56 could be constructed from any suitable material without departing from the scope of the present invention. Moreover, while the airfoil 56 is extruded from a single material, those having ordinary skill in the art will appreciate that the airfoil 56 could be formed from a plurality of materials, such as by co-extrusion, over-molding, skin coating, etc., without departing from the scope of the present invention.

As illustrated in FIGS. 2 and 3, the wiper assembly 46 may also include a pair of end caps, generally indicated at 58. The end caps 58 are adapted to be disposed adjacent to the distal ends 62 of the support member 50. The end caps 58 are secured to the support member 50 and may have a profile that substantially mimics the contours of the airfoil assembly 56 to maintain the wind lift characteristics of the wiper assembly 46 and to provide an increased aesthetic value. The end caps 58 also provide a mass increase adjacent to the distal ends 62 of the support member 50 that helps prevent localized chatter along the extremities of the wiping element 48 caused by a combination of wind lift and a decrease in the force distributed to this area from the wiper arm 44 via the support member 50, as described above. It should be appreciated that the end caps 58 may include a locking arm (not shown, but generally known in the art) or other features that engage and secure to the notches 64 of the support member 50.

As mentioned above, the adapter 54 of the present invention is configured to be operatively attached to a wiper assembly 46. In one embodiment, the adapter 54 is pivotally attached to the saddle 72 which, in turn, is attached to the coupler 52. In general, adapters 54 are employed to releasably attach the wiper assembly 46 to one or more types of wiper arms 44. Those having ordinary skill in the art will appreciate that different OEM's employ wiper arms 44 configured to releasably attach to different adapters 54 which are, in turn, operatively attached to a specific wiper assembly 46. By way of example, certain wiper arm 44 types employed by OEM's include "bayonet-style"; "pin-type"; "hook-type"; "push-button"; "pinch-tab"; "top-lock"; or "side-pin" connection systems of various sizes. As such, it will be appreciated that wiper arms 44 can generally be connected to wiper assemblies 46 in a number of different ways, using different sizes and styles of connection systems. Depending on the application, the wiper assembly 46 may be configured to attach to a number of different wiper arms 44 using a single adapter 54, particularly where the wiper assembly 46 is designed for sale in the aftermarket. As such, it will be appreciated that the specific configuration of the adapter 54 may vary to accommodate different type(s) of wiper arms 44.

Figure 4:
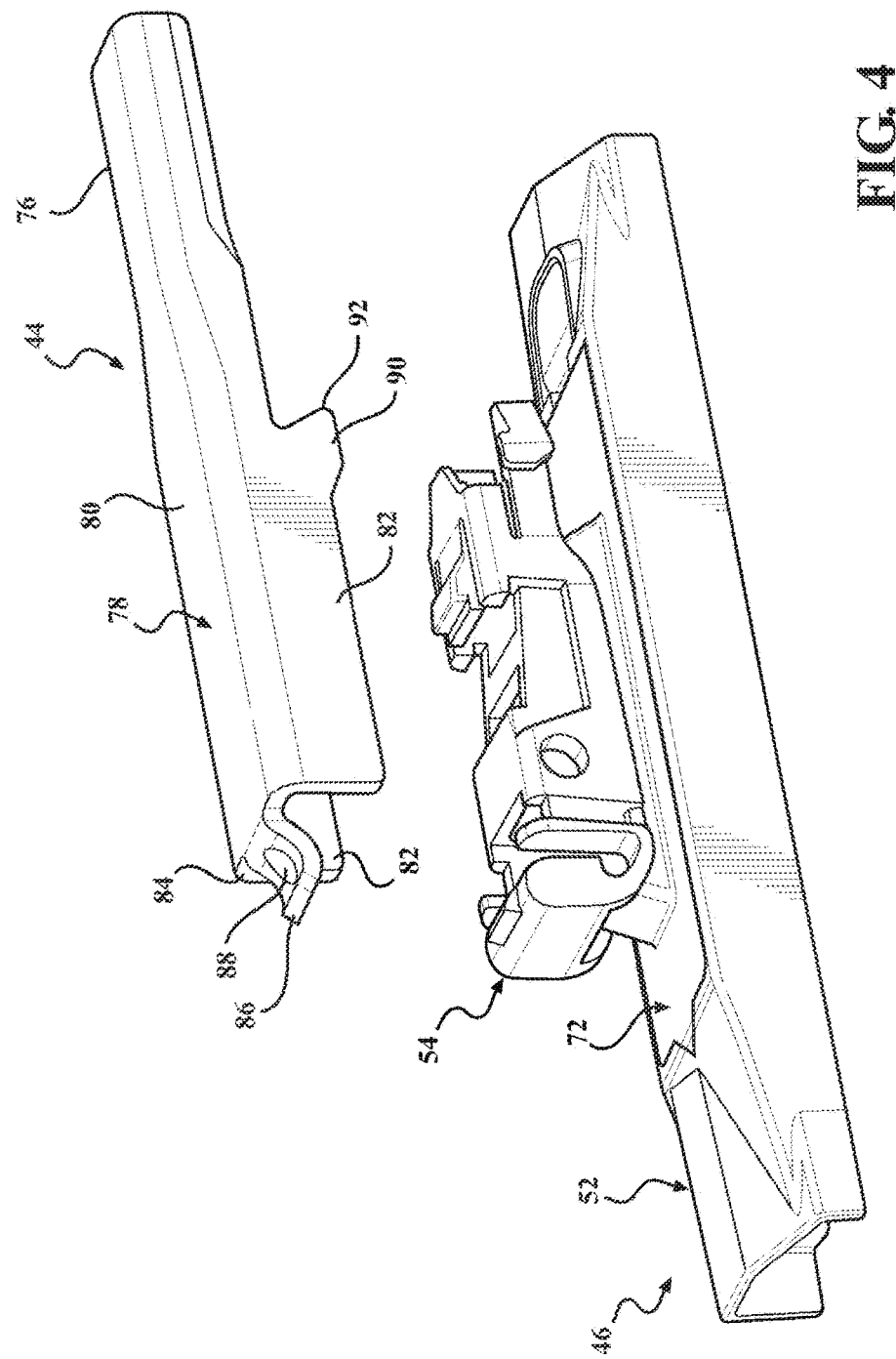
FIG. 4 is a partial perspective view of the wiper assembly of FIGS. 2-3, showing an adapter pivotally mounted to a coupler and positioned adjacent to a wiper arm.
Figure 5:
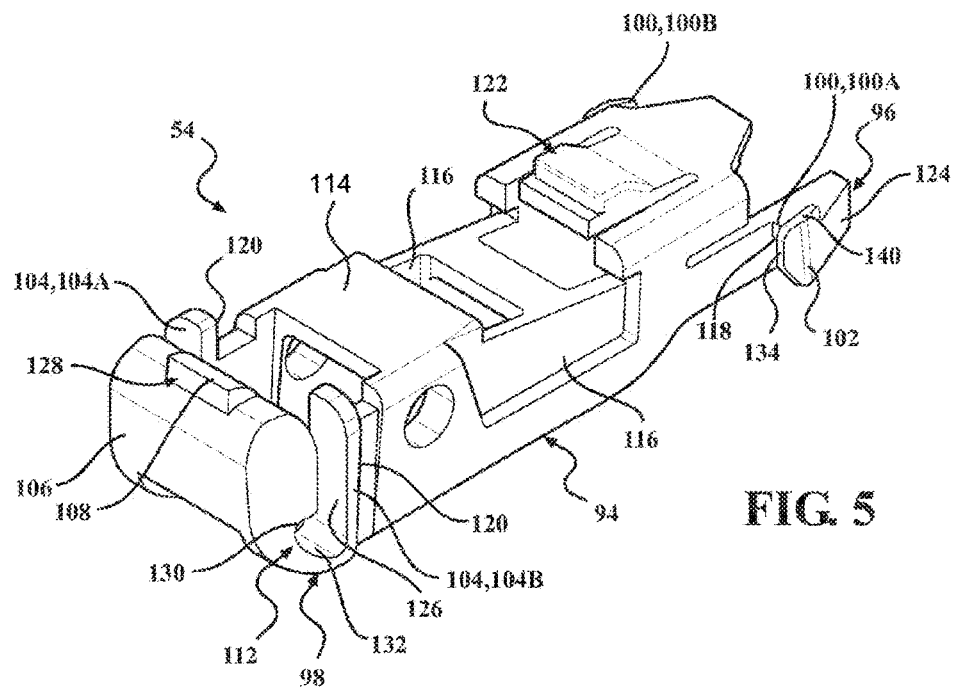
FIG. 5 is an enlarged perspective view of the adapter of FIG. 4, according to one embodiment of the present invention.
Figure 6:
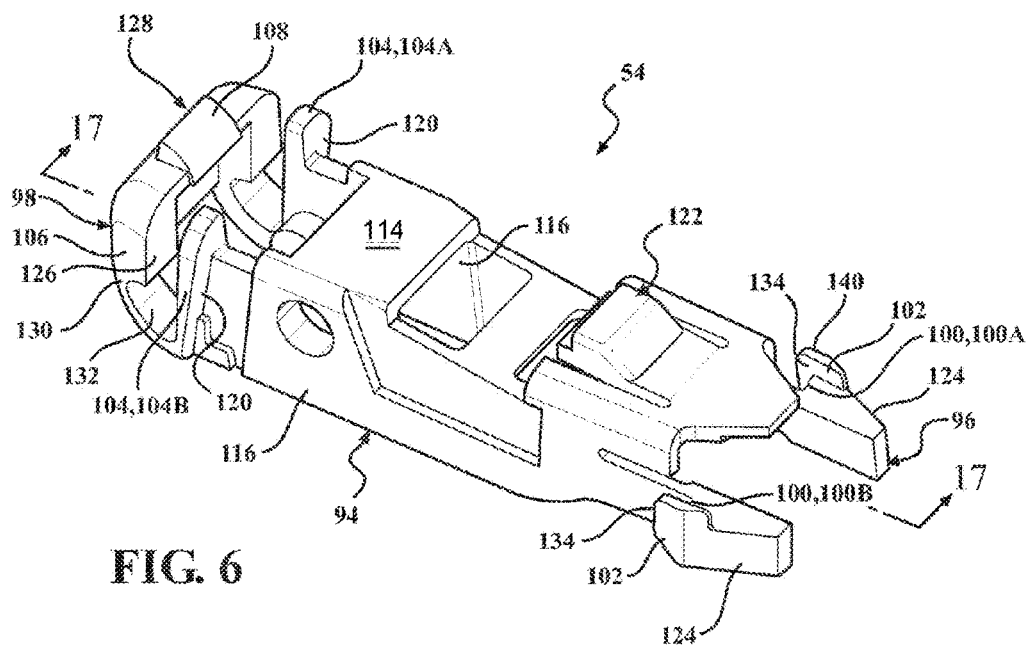
FIG. 6 is an alternate perspective view of the adapter of FIG. 5.
Figure 7:
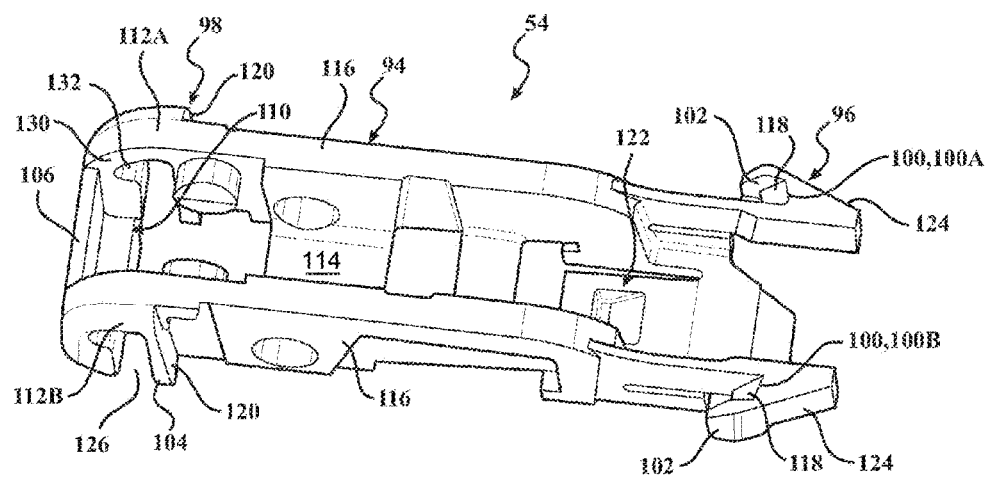
FIG. 7 is an alternate perspective view of the adapter of FIGS. 5-6.
Figure 8:
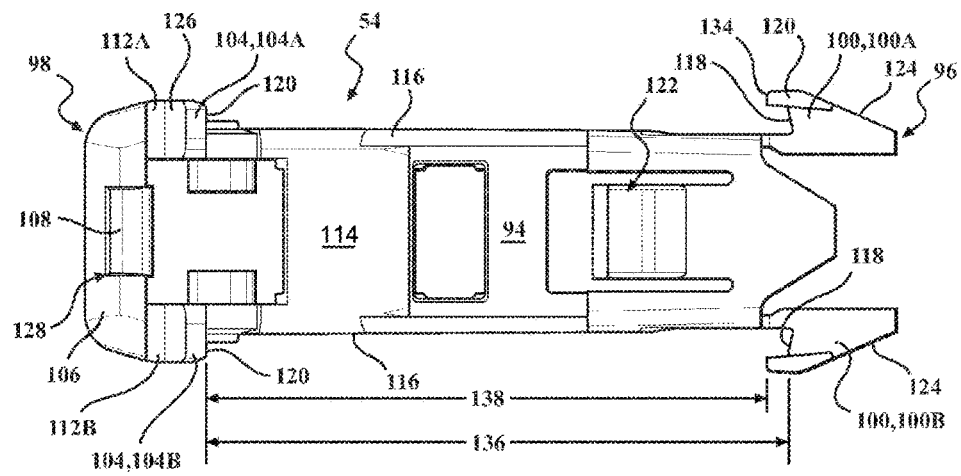
FIG. 8 is a top plan view of the adapter of FIGS. 5-7.

As noted above, the adapter 54 is configured to releasably attach to the wiper arm 44. Specifically, the adapter 54 releasably attaches the wiper assembly 46 to a wiper arm 44 having a specific type of attachment member 76, which is described more thoroughly below. Typically, the attachment member 76 is formed separately from the wiper arm 44 and then operatively attached thereto, such as by crimping or welding. However, those having ordinary skill in the art will appreciate that the attachment member 76 could also be formed integrally with the wiper arm 44. Referring now to FIG. 4, the attachment member 76 includes a track, generally indicated at 78, that is defined by a base 80 and a pair of walls 82 depending therefrom. The track 78 extends to a terminal end 84 (see FIG. 4), from which a bent tab 86 extends outwardly. The bent tab 86 may also include an aperture 88 disposed therein. The attachment member 76 also includes a pair of fins 90 that each extend to respective fin ends 92. As shown in FIG. 4, the fins 90 merge with or are otherwise formed as a part of the walls 64 of the track 78. Those having ordinary skill in the art will appreciate from the discussion that follows that neither the wiper arm 44 nor the attachment member 76 described above form part of the present invention.

One example of the attachment member 76 described above is what is sometimes referred to in the art as a "pinch tab" wiper arm. Such a "pinch tab" wiper arm is described in U.S. Pat. Nos. 7,891,044 and 7,937,798, which teach connecting the "pinch tab" wiper arm to a wiper blade using what is known in the related art as a "toe-to-heel" method. Those having ordinary skill in the art will appreciate that the "toe-to-heel" method is unsatisfactory in that it necessitates positioning the "pinch tab" wiper arm and wiper awkwardly to effect attachment. In particular, and in certain automotive applications, achieving the necessary positioning is significantly difficult, or even impossible, due to the relative positions of the arms 44 and the cowl 32 of the vehicle 30. By way of example, certain vehicles 30 are designed such that the wiper arms 44 are covered by a portion of the cowl 32. Thus, as will be appreciated from the description of the adapter 54 below, the present invention is directed toward effecting attachment with a "pinch tab" wiper arm using a "heel-to-toe" or "top down" methodology at advantageously improved relative positioning, thereby enabling a significantly broader range of positions to be used during attachment of the wiper assembly 46.

Referring now to FIGS. 4-17, one embodiment of the adapter 54 of the present invention is shown. The adapter 54 includes a body, generally indicated at 94, that has a first end 96 and a second end 98. The adapter 54 also includes at least one retention member 100 on the body 94 at the first end 96 for abutting at least one of the fins 90 of the wiper arm 44 when the wiper assembly 46 is attached to the wiper arm 44. The adapter 54 further includes a canard 102 extending from the retention member 100 toward the second end 98 of the body 94. The canard 102 is adapted to be disposed adjacent to at least one of the walls 82 of the wiper arm 44 when the wiper assembly 46 is attached to the wiper arm 44. The adapter 54 still further includes at least one stop member 104. The stop member 104 is disposed closer to the second end 98 of the body 94 than to the first end 96 for abutting the end 84 of the wiper arm 44 when the wiper assembly 46 is attached to the wiper arm 44. The adapter 54 also includes a guard 106 spaced longitudinally from the stop member 104. The guard 106 has an upper cam surface 108 and an engagement surface 110. The upper cam surface 108 is adapted to cooperate with the bent tab 86 of the wiper arm 44 in camming relationship when the wiper assembly 46 is being attached to the wiper arm 44. The engagement surface 110 is spaced from the upper cam surface 108 and is adapted to abut at least a portion of the bent tab 86 of the wiper arm 44 when the wiper assembly 46 is attached to the wiper arm 44. The adapter 54 also includes a resilient bridge 112 connecting the guard 106 to the body 94. The bridge 112 is adapted to flex when the guard 106 pivots away from the stop member 104 in response to force translated to the upper cam surface 108 from the bent tab 86 of the wiper arm 44 until the engagement surface 110 of the guard 106 abuts at least a portion of the bent tab 86 of the wiper arm 44. Each of the above components will be described in greater detail below.

As shown best in FIGS. 5-9, the body 94 of the adapter 54 includes a deck 114 extending between the first end 96 and the second end 98, and a pair of opposing sidewalls 116 depending from the deck 114. In one embodiment, the deck 114 and the stop member 104 define an obtuse angle therebetween (see FIG. 9). However, those having ordinary skill in the art will appreciate that the adapter 54 could be configured differently, with any suitable angle defined between the stop member 104 and the deck 114, without departing from the scope of the present invention.

The stop member 104 and retention member 100 are spaced from on another at a longitudinal distance that corresponds to the spacing between the end 84 and fins 90 of the wiper arm 44. In this way, the stop member 104 and retention member 100 help position the wiper arm 44 and wiper assembly 46 longitudinally during connection. Further, as will be appreciated from subsequent description of the guard 106, the longitudinal alignment afforded by the stop member 104 also helps prevent improper connection of the wiper assembly 46 to the wiper arm 44 in "toe to heel" fashion, as noted above.

As shown best in FIGS. 5-9, in one embodiment, the retention member 100 includes a retention surface 118 adapted to be disposed in abutting relationship with one of the fin ends 92 of the wiper arm 44 when the wiper assembly 46 is attached to the wiper arm 44, and the stop member 104 includes a stop surface 120 adapted to be disposed in abutting relationship with at least a portion of the end 84 of the wiper arm 44 when the wiper assembly 46 is attached to the wiper arm 44.

In the representative embodiment illustrated herein, the stop member 104 is realized as a pair of stop members 104A, 104B each disposed on one of the sidewalls 116 of the body 94. However, those having ordinary skill in the art will appreciate that the longitudinal alignment afforded by the stop member 104 described above can be achieved without the use of a pair of stop members 104A, 104B, or by using a stop member 104 that is shaped or configured differently, without departing from the scope of the present invention. Similarly, while the retention member 100 illustrated throughout the drawings is realized as a pair of opposing retention members 100A, 100B each having a respective canard 102 extending therefrom, a single retention member 100 and/or a single canard 102 could be utilized without departing from the scope of the present invention.

In one embodiment, the adapter 54 also includes a resilient button 122 disposed between the sidewalls 116 adjacent the deck 114, with at least one of the retention members 100A, 100B including a rear chamfer 124 facing away from the first end 96 of the body 94. The chamfer 124 and button 122 cooperate so as to facilitate releasable attachment of the adapter 54 to a different wiper arm attachment member, such as a "top-lock" wiper arm (not shown, but generally known in the art). The button 122 is configured so as to resiliently deflect downwardly away from the attachment member 76 of the wiper arm 44, and may engage the base 80 of the track 78 of the attachment member 76 when the wiper assembly 46 is attached to the wiper arm 44 (not shown in detail, but generally known in the art).

While the adapter 54 illustrated in FIGS. 4-17 includes a chamfer 124 on only one of the retention members 100A, 100B, it will be appreciated that both retention members 100A, 100B could include a chamfer. Moreover, it will be appreciated that the chamfer 124 and/or button 122 could be configured differently, or omitted entirely, without departing from the scope of the present invention.

Figure 9:
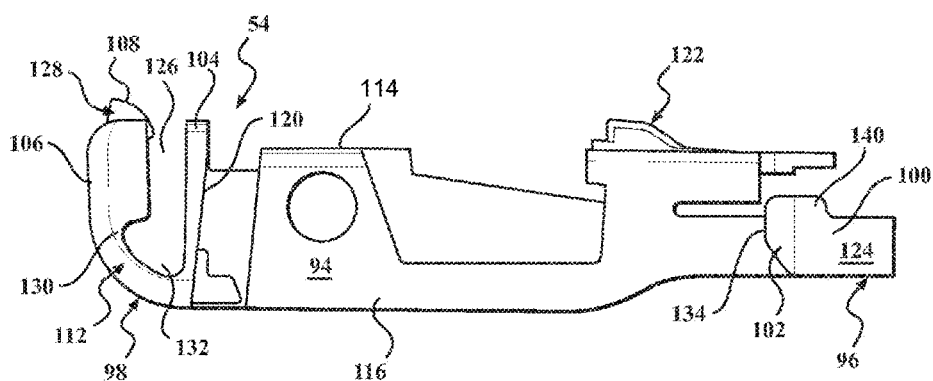
FIG. 9 is a right side plan view of the adapter of FIGS. 5-8.

As best shown in FIG. 9, the stop member 104 and the guard 106 cooperate to define a gap 126 disposed vertically above the bridge 112 and longitudinally between the guard 106 and the stop member 104. In the embodiment illustrated throughout the drawings, the upper cam surface 108 of the guard 106 partially extends into the gap 126. More specifically, the guard 106 includes a cam member 128 that defines the upper cam surface 108 and is spaced longitudinally from and laterally between the stop members 104A, 104B (see FIGS. 8 and 9). However, those having ordinary skill in the art will appreciate that the guard 106 could be configured in a number of different ways and, thus, that a discrete cam member 128 could be omitted or otherwise configured differently without departing from the scope of the present invention.

In one embodiment, the guard 106 includes a lower guard portion 130 spaced from at least one of the engagement surface 110 and/or the upper cam surface 108, with the bridge 112 extending from the second end 98 of the body 94 to the lower guard portion 130 of the guard 106. Moreover, the bridge 112 may have a substantially arcuate profile (see FIG. 9) extending longitudinally from the second end 98 of the body 94 and merging vertically with the lower guard portion 130 of the guard 106. The lower guard portion 130 and the arcuate profile of the bridge 112 cooperate to define a gap pocket 132 adjacent to and merging with the gap 126. In the representative embodiment illustrated throughout the drawings, the bridge 112 is realized as a pair of bridges 112A, 112B extending between each of the stop members 104A, 104B and the guard 106. However, those having ordinary skill in the art will appreciate that the bridge 112, guard 106, and the gap 126 could be configured differently without departing from the scope of the present invention.

As noted above, the bridge 112 is adapted to flex when the guard 106 pivots away from the stop member 104 in response to force translated to the upper cam surface 108 from the bent tab 86 of the wiper arm 44 until the engagement surface 110 of the guard 106 abuts at least a portion of the bent tab 86 of the wiper arm 44. It will be appreciated that the bent tab 86 may come into contact with the engagement surface 110 at more than one location. Thus, the engagement surface 110 may be defined by a plurality of engagement surfaces 110A, 110B (see FIG. 17), defined in any suitable way and in any suitable location on the guard 106, without departing from the scope of the present invention.

As noted above, the adapter 54 of the present invention includes at least one canard 102. The canard 102 extends to a canard end 134 spaced longitudinally between the retention surface 118 and the stop surface 120. In one embodiment, a first longitudinal distance 136 is defined between the stop surface 120 and the retention surface 118, and a second longitudinal distance 138 is defined between the stop surface 120 and the canard end 134 (see FIG. 8). Advantageously, a ratio between first distance 136 and the second distance 138 is at least 1.025:1. In the representative embodiment illustrated throughout the figures, the ratio is approximately 1.03:1. However, those having ordinary skill in the art will appreciate that any suitable ratio sufficient to shield the retention member 100, as noted above, could be used without departing from the scope of the present invention.

As shown best in FIG. 9, in one embodiment, the canard 102 also includes an upper canard portion 140 extending vertically above the retention member 100. It will be appreciated that the upper canard portion 140 helps prevent improper connection of the wiper assembly 46 and wiper arm 44 by aiding in shielding the retention member 100, as noted above. The upper canard portion 140 has a generally rounded rectangular profile that merges with the canard 102. However, those having ordinary skill in the art will appreciate that the upper canard portion 140 could be configured differently, or omitted entirely, without departing from the scope of the present invention.

Figure 10:
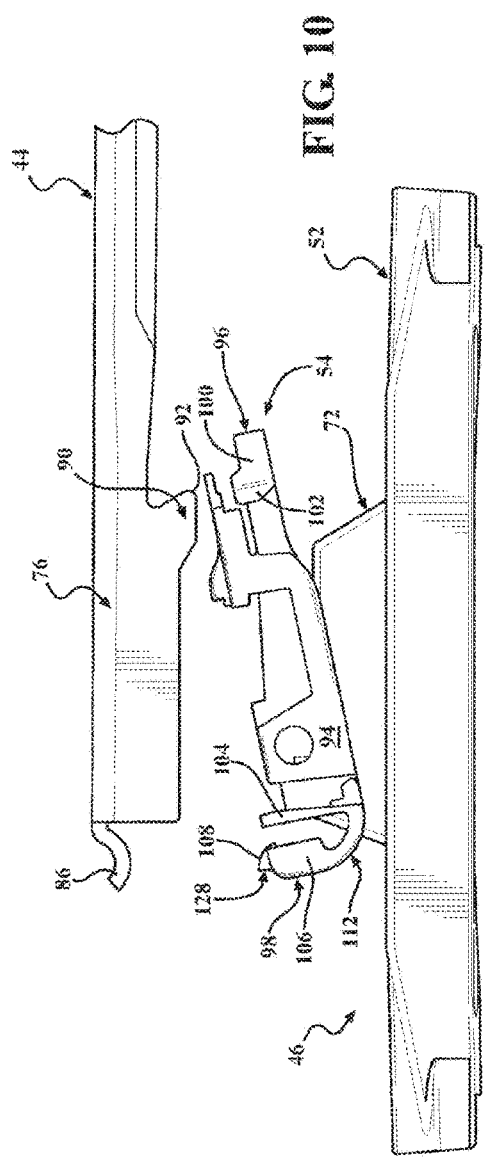
FIG. 10 is a right side plan view of the adapter, coupler, and arm of FIG. 4 in a pre-assembly configuration.
Figure 11:
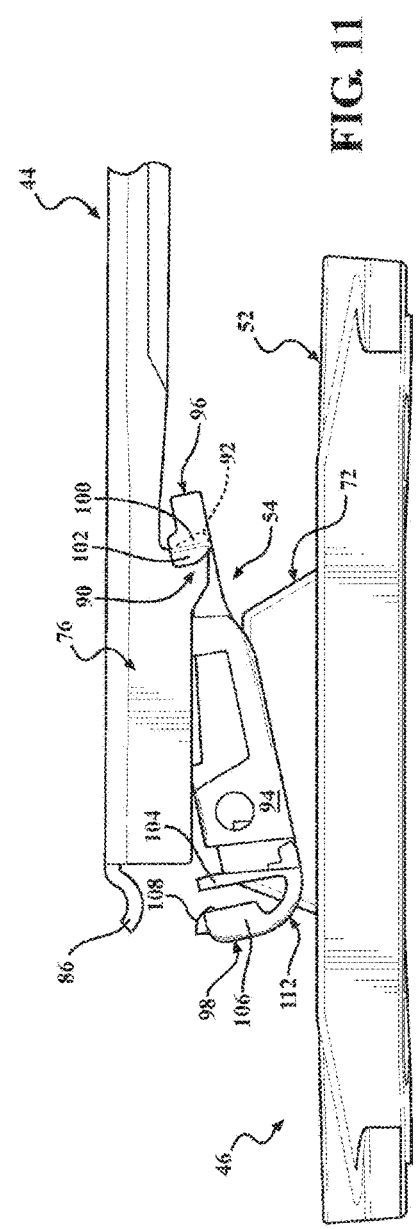
FIG. 11 is a right side plan view of the adapter, coupler, and arm of FIG. 10 in a first mid-assembly configuration.
Figure 14:
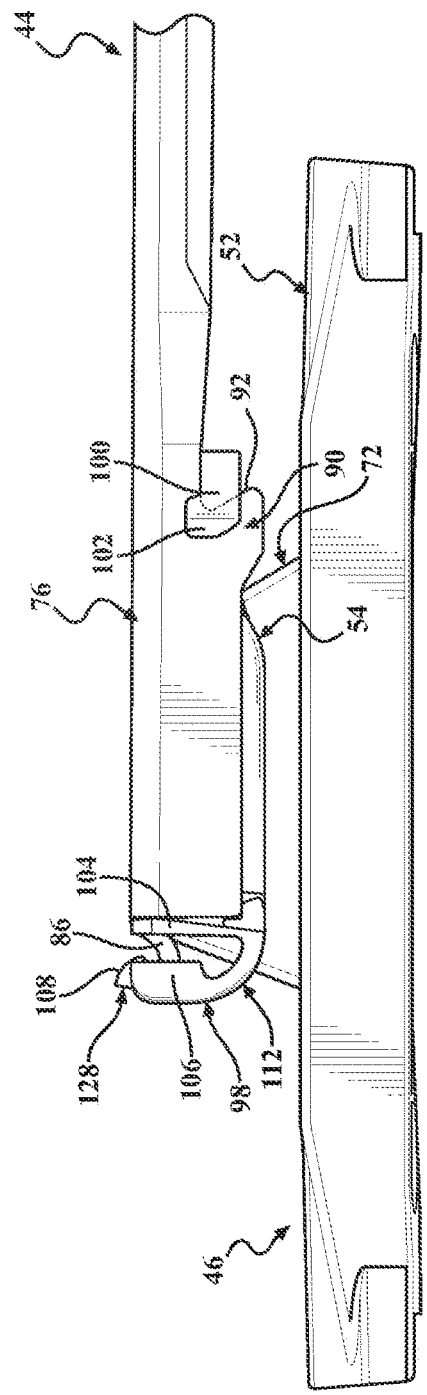
FIG. 14 is a right side plan view of the adapter, coupler, and arm of FIGS. 10-13 in an assembled configuration.
Figure 15:
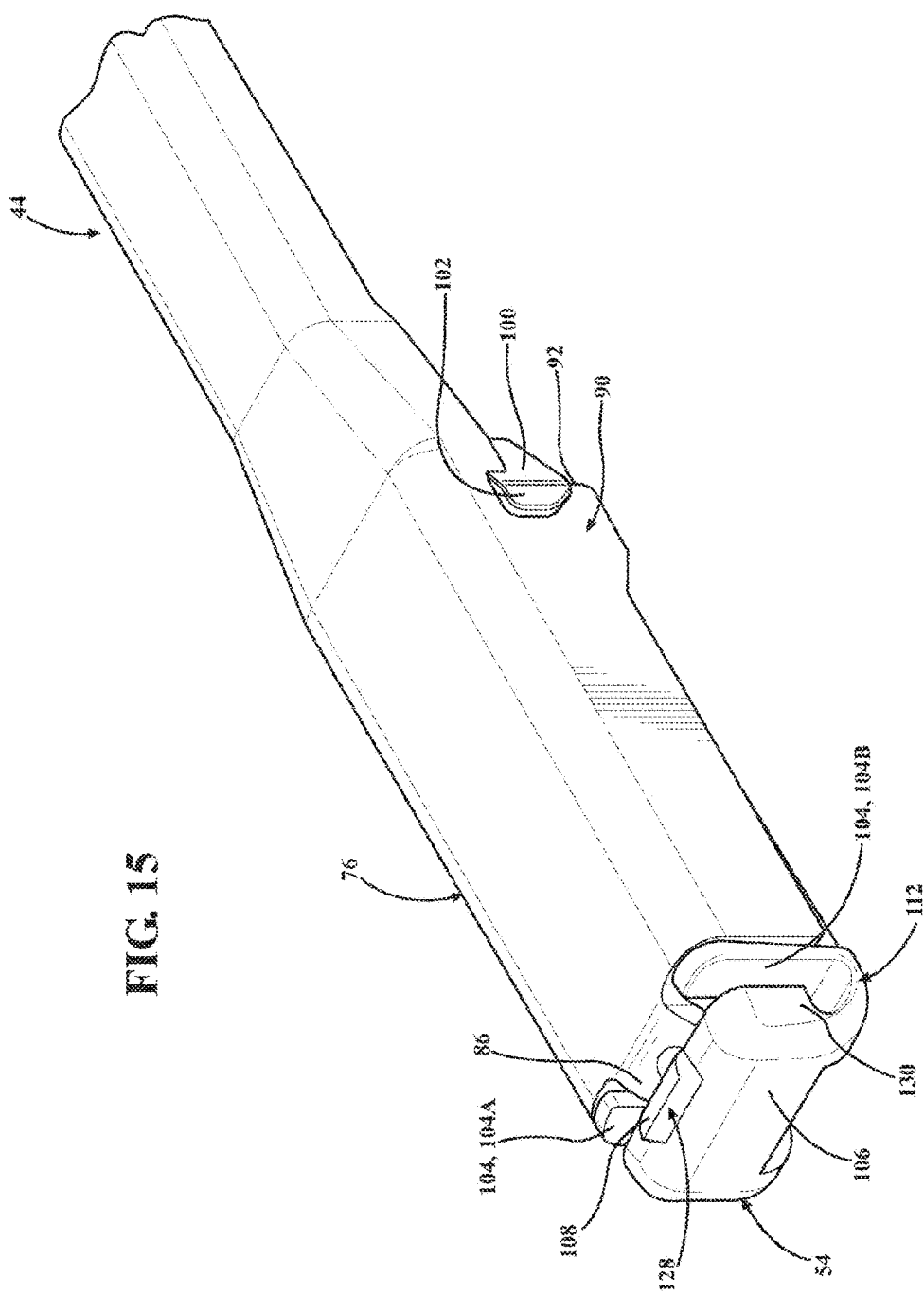
FIG. 15 is a perspective view of the adapter and arm of FIG. 14 in an assembled configuration.
Figure 16:
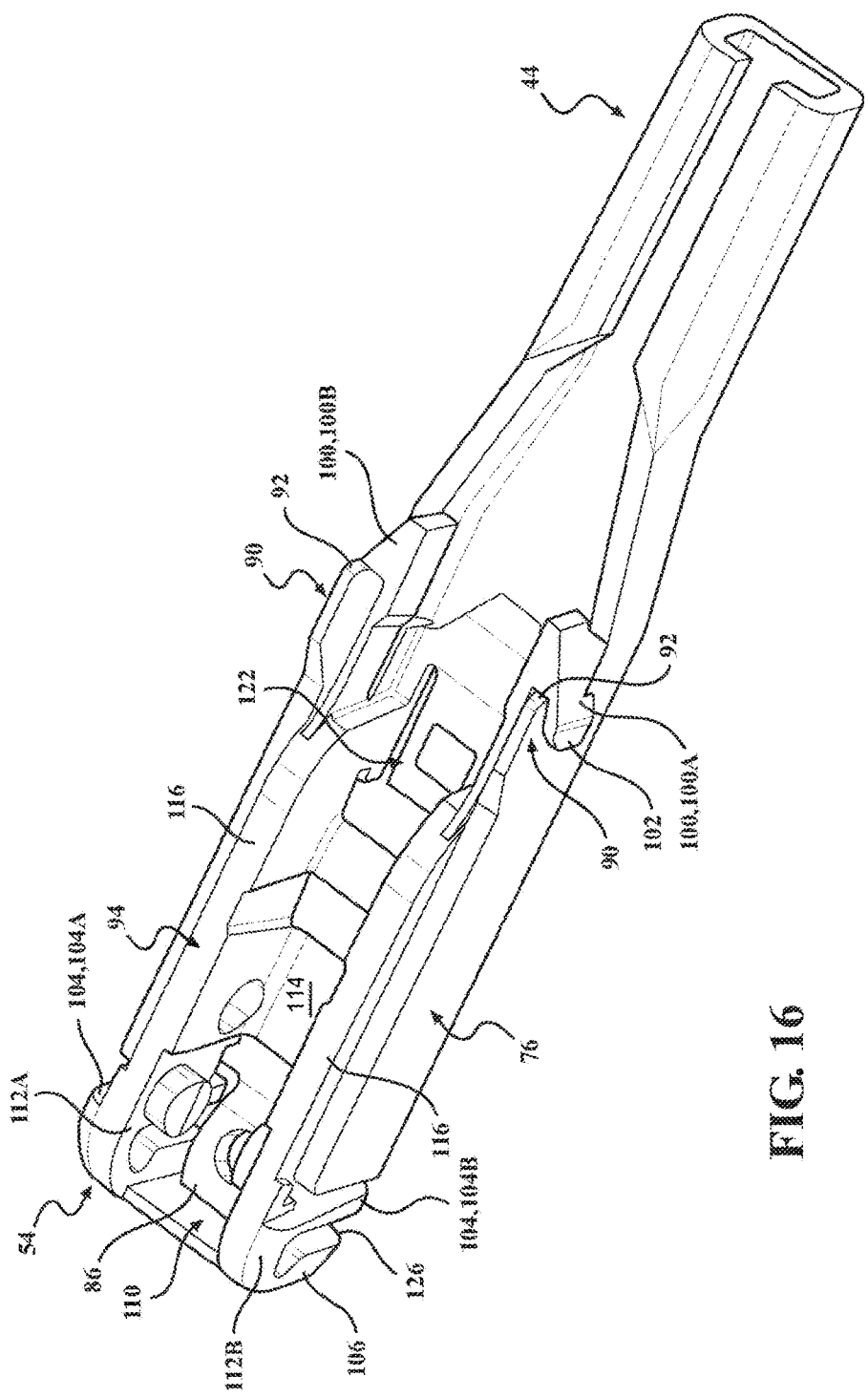
FIG. 16 is an alternate perspective view of the adapter and arm of FIG. 15.
Figure 17:
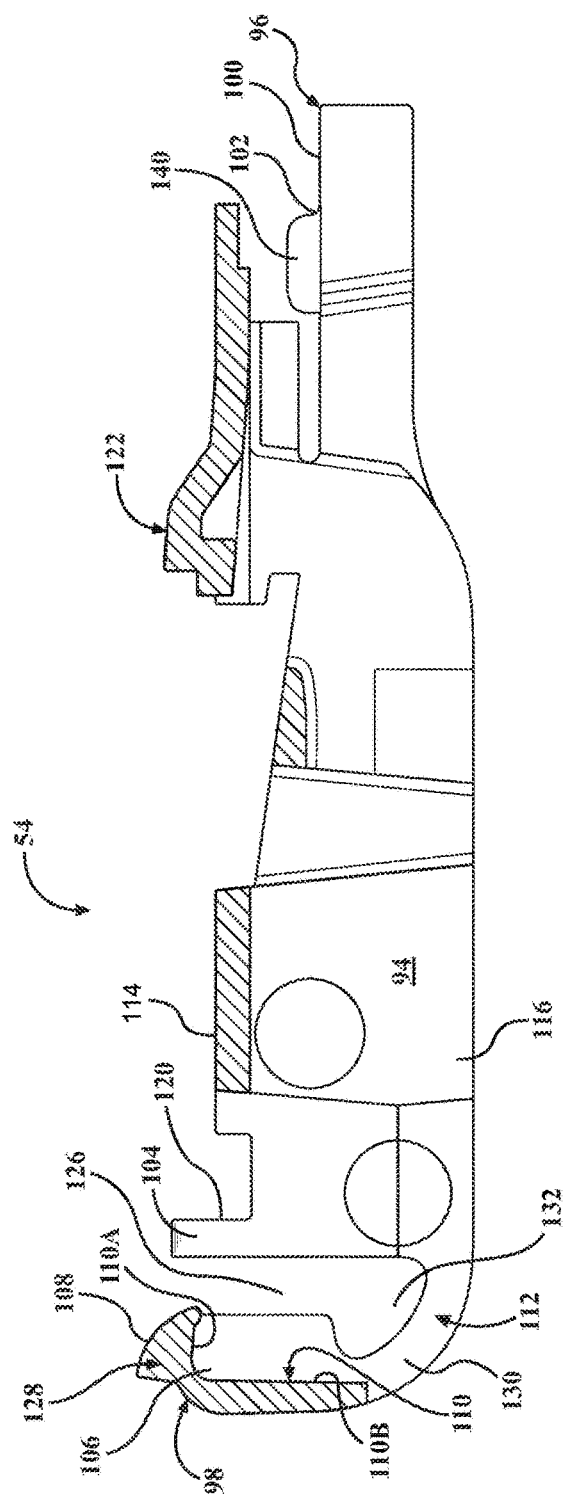
FIG. 17 is a sectional view taken along line 17-17 of FIG. 6.

In operation, to effect proper "heel-to-toe" connection to the wiper arm 44, the wiper assembly 46 is positioned such that the attachment member 76 is near the adapter 54 (see FIG. 10). Next, the fins 90 of the attachment member 76 of the wiper arm 44 can be pressed against the retention member 100 of the adapter 54 (see FIG. 11). Subsequently, the attachment member 76 can be brought closer to the wiper assembly 46 until the bent tab 86 of the attachment member 76 engages the upper cam surface 108 of the guard 106 of the adapter 54 (see FIG. 12). As the wiper arm 44 and wiper assembly 46 are brought closer toward each other, the force translated from the bent tab 86 causes the bridge 112 to flex, allowing the guard 106 to bend away from the stop member 104 (see FIG. 13). Once the guard 106 pivots far enough away from the stop member 104, the bent tab 86 of the attachment member 76 of the wiper arm 44 disengages from the upper cam surface 108, and the bridge 112 simultaneously relaxes as the guard 106 pivots back toward the stop member 104, whereby the engagement surface 110 of the guard 106 comes into contact with the bent tab 86 (see FIG. 14).

Thus, the adapter 54 of the present invention is configured so as to prevent improper connection of the wiper assembly 46 to the wiper arm 44. Specifically, the adapter 54 is configured such that "toe-to-heel" connection is impossible. To that end, the guard 106 is spaced from the stop member 104 such that if improper "toe-to-heel" attachment were attempted, the end 84 of the wiper arm 44 would bear against the stop member 104 but not engage the guard 106. Moreover, the canard 102 shields the retention member 100 such that the fins 90 of the wiper arm 44 can never come into secure abutment with the retention member 100 if improper "toe-to-heel" attachment is attempted.

In this way, the present invention provides simple releasable attachment of a wiper assembly 46 to a "pinch tab" wiper arm 44. Specifically, those having ordinary skill in the art will appreciate that the guard 106 and stop member 104 of the adapter 54 cooperate so as to make incorrect "toe-to-heel" connection between the wiper assembly 46 and wiper arm 44 impossible. Moreover, it will be appreciated that the "heel-to-toe" attachment afforded by the adapter 54 enables a more secure connection of the wiper assembly 46 and wiper arm 44 at more advantageous angles and, thus, significantly improves ease-of-use on a substantial number of vehicle 30 types, makes, and models, in particular where the vehicle 30 utilizes a cowl 32 that covers or otherwise partially hides the wiper arm 44.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An adapter for use in releasably attaching a wiper assembly to a wiper arm having an attachment member including a track defined by a base and walls depending therefrom, the base having an end with a bent tab extending outwardly therefrom, the walls having fins that extend to fin ends, said adapter comprising:
   a body having a first end and a second end;
   at least one retention member on said body at said first end having a respective retention surface, which extends sidewardly from said body to an outer end of said at least one retention member and faces longitudinally for abutting at least one of the fins of the wiper arm when the wiper assembly is attached to the wiper arm;
   a canard extending longitudinally from said outer end of said at least one retention member so as to project longitudinally from said retention surface toward said second end of said body, wherein said canard is adapted to be disposed outwardly adjacent to a respective one of the walls of the wiper arm when the wiper assembly is attached to the wiper arm;
   at least one stop member disposed on said body closer to said second end than to said first end for abutting the end of the wiper arm when the wiper assembly is attached to the wiper arm;
   a guard spaced longitudinally from said at least one stop member and having an upper cam surface adapted to cooperate with the bent tab of the wiper arm in camming relationship when the wiper assembly is being attached to the wiper arm, and an engagement surface spaced from said upper cam surface for abutting at least a portion of the bent tab of the wiper arm when the wiper assembly is attached to the wiper arm; and
   a resilient bridge projecting longitudinally from said second end of said body and connecting said guard to said body, wherein said resilient bridge is adapted to flex such that said guard pivots longitudinally away from said at least stop member in response to force translated to said upper cam surface from the bent tab of the wiper arm and pivots back toward said at least one stop member when said engagement surface of said guard abuts at least a portion of the bent tab of the wiper arm.

2. The adapter as set forth in claim 1, including said at least one retention member which comprises a pair of opposing retention members each having a respective said canard extending therefrom.

3. The adapter as set forth in claim 2, further including a resilient button on said body, and wherein at least one of said opposing retention members includes a rear chamfer facing away from said first end of said body, said chamfer and said button cooperating so as to facilitate releasable attachment of said adapter to a different wiper arm attachment member.

4. The adapter as set forth in claim 1, wherein said at least one retention member includes said retention surface which is adapted to be disposed in abutting relationship with one of the fin ends of the wiper arm when the wiper assembly is attached to the wiper arm, and wherein said at least one stop member includes a stop surface which is adapted to be disposed in abutting relationship with at least a portion of the end of the wiper arm when the wiper assembly is attached to the wiper arm.

5. The adapter as set forth in claim 4, wherein said canard extends to a canard end spaced longitudinally between said retention surface and said stop surface and spaced sidewardly away from said body; and wherein a first distance is defined longitudinally between said stop surface and said retention surface, and a second distance is defined longitudinally between said stop surface and said canard end wherein said second distance is shorter than said first distance.

6. The adapter as set forth in claim 1, wherein said at least one stop member extends vertically above said second end of said body.

7. The adapter as set forth in claim 1, wherein said bridge projects longitudinally from said body, and said at least one stop member and said guard cooperate to define a gap disposed vertically above said bridge and longitudinally between said guard and said stop member to permit pivoting of said guard away from said at least one stop member.

8. The adapter as set forth in claim 7, wherein said upper cam surface of said guard extends at least partially into said gap.

9. The adapter as set forth in claim 1, wherein said guard includes a lower guard portion spaced from at least one of said engagement surface and/or said upper cam surface, with said bridge extending longitudinally from said second end of said body to said lower guard portion, wherein an upper guard portion is disposed above said lower guard portion and is displaceable longitudinally away from said at least one stop member.

10. The adapter as set forth in claim 1, wherein said body includes a pair of opposing sidewalls extending between said first end and said second end, and wherein said at least one stop member is further defined as a pair of stop members each disposed on one of said sidewalls.

11. The adapter as set forth in claim 10, wherein said guard includes a cam member defining said cam surface, said cam member being spaced longitudinally from and defined laterally between said pair of stop members.

12. The adapter as set forth in claim 1, wherein said canard includes an upper canard portion extending vertically above said retention member and said retention surface.

13. The adapter as set forth in claim 1, wherein said body includes a deck extending between said first end and said second end, and a pair of opposing sidewalls depending from said deck; and wherein said deck and said at least one stop member define an obtuse angle therebetween.

14. A wiper assembly for use in releasably attaching to a wiper arm having an attachment member including a track defined by a base and walls depending therefrom, the base having an end with a bent tab extending outwardly therefrom, the walls having fins that extend to fin ends, said wiper assembly comprising:
a wiping element adapted to contact the surface to be wiped;
at least one elongated spline acting to support said wiping element, said spline having opposing longitudinal ends;
an airfoil operatively attached to said spline;
a pair of end caps operatively attached to each of said longitudinal ends of said spline;
a coupler operatively attached to said spline between said longitudinal ends; and
an adapter pivotally attached to said coupler, said adapter including:
a body having a first end and a second end;
at least one retention member on said body at said first end having a respective retention surface, which extends sidewardly from said body to an outer end of said at least one retention member and faces longitudinally for abutting at least one of the fins of the wiper arm when the wiper assembly is attached to the wiper arm;
a canard extending longitudinally from said outer end of said at least one retention member so as to project longitudinally from said retention surface toward said second end of said body, wherein said canard is adapted to be disposed outwardly adjacent to a respective one of the walls of the wiper arm when the wiper assembly is attached to the wiper arm;
at least one stop member disposed on said body closer to said second end than to said first end for abutting the end of the wiper arm when the wiper assembly is attached to the wiper arm;
a guard spaced longitudinally from said at least one stop member and having an upper cam surface adapted to cooperate with the bent tab of the wiper arm in camming relationship when the wiper assembly is being attached to the wiper arm, and an engagement surface spaced from said upper cam surface for abutting at least a portion of the bent tab of the wiper arm when the wiper assembly is attached to the wiper arm; and
a resilient bridge projecting longitudinally from said second end of said body and connecting said guard to said body, wherein said resilient bridge is adapted to flex such that said guard pivots longitudinally away from said at least one stop member in response to force translated to said upper cam surface from the bent tab of the wiper arm and pivots back toward said at least one stop member when said engagement surface of said guard abuts at least a portion of the bent tab of the wiper arm.

15. The wiper assembly as set forth in claim 14, including said at least one retention member which comprise a pair of opposing retention members each having a respective said canard extending therefrom.

16. The wiper assembly as set forth in claim 15, further including a resilient button on said body, and wherein at least one of said opposing retention members includes a rear chamfer facing away from said first end of said body, said chamfer and said button cooperating so as to facilitate releasable attachment of said adapter to a different wiper arm attachment member.

17. The wiper assembly as set forth in claim 14, wherein said at least one retention member includes said retention surface which is adapted to be disposed in abutting relationship with one of the fin ends of the wiper arm when the wiper assembly is attached to the wiper arm, and wherein said at least one stop member includes a stop surface which is adapted to be disposed in abutting relationship with at least a portion of the end of the wiper arm when the wiper assembly is attached to the wiper arm.

18. The wiper assembly as set forth in claim 17, wherein said canard extends to a canard end spaced longitudinally between said retention surface and said stop surface and spaced sidewardly away from said body; and wherein a first distance is defined longitudinally between said stop surface and said retention surface, and a second distance is defined longitudinally between said stop surface and said canard end wherein said second distance is shorter than said first distance.

19. The wiper assembly as set forth in claim 14, wherein said at least one stop member extends vertically above said second end of said body.

20. The wiper assembly as set forth in claim 14, wherein said canard includes an upper canard portion extending vertically above said at least one retention member.

* * * * *